(12) United States Patent
Hendriks et al.

(10) Patent No.: US 7,998,913 B2
(45) Date of Patent: Aug. 16, 2011

(54) FLOW MODIFIERS FOR IMPROVED MAGNETIC RECORDING DEVICE

(75) Inventors: Ferdinand Hendriks, Morgan Hill, CA (US); Thomas Edward Karis, Aromas, CA (US); Kunihiro Shida, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1100 days.

(21) Appl. No.: 11/761,064

(22) Filed: Jun. 11, 2007

(65) Prior Publication Data

US 2008/0304177 A1 Dec. 11, 2008

(51) Int. Cl.
*C10M 129/68* (2006.01)
*C10M 105/36* (2006.01)
*G11B 17/08* (2006.01)

(52) U.S. Cl. ........ 508/504; 508/465; 508/496; 508/501; 508/579; 360/98.08

(58) Field of Classification Search ................ 508/582, 508/504, 565, 465, 496; 360/98.08
See application file for complete search history.

(56) References Cited

U.S. PATENT DOCUMENTS

| 4,443,348 | A | 4/1984 | Wright et al. |
| 4,639,323 | A | 1/1987 | Liao |
| 4,673,997 | A | 6/1987 | Gowda et al. |
| 5,224,782 | A | 7/1993 | Miwa et al. |
| 5,627,147 | A | 5/1997 | Hayakawa et al. |
| 5,663,127 | A * | 9/1997 | Flynn et al. .................... 508/250 |
| 6,181,517 | B1 * | 1/2001 | Yanagisawa et al. ...... 360/235.4 |
| 6,335,310 | B1 | 1/2002 | Suekuni et al. |
| 6,678,115 | B2 * | 1/2004 | Khan .......................... 360/99.08 |
| 6,685,356 | B2 | 2/2004 | Hirata |
| 2002/0111279 | A1 | 8/2002 | Miyamoto et al. |
| 2005/0015791 | A1 * | 1/2005 | Herndon et al. .............. 720/695 |
| 2005/0123855 | A1 * | 6/2005 | Hegel ....................... 430/270.11 |
| 2005/0209480 | A1 * | 9/2005 | Nakata .......................... 560/184 |
| 2006/0019840 | A1 | 1/2006 | Kawahara et al. |

FOREIGN PATENT DOCUMENTS

| EP | 0667617 A2 * | 8/1995 |
| GB | 2278612 A | 12/1994 |
| JP | 5320682 | 12/1993 |
| JP | 6057279 | 3/1994 |
| JP | 07138586 | 5/1995 |
| JP | 8034987 | 2/1996 |
| JP | 2004051720 | 2/2004 |
| JP | 2005029647 | 2/2005 |
| JP | 2005232434 | 9/2005 |

OTHER PUBLICATIONS

R.T. Vanderbilt Company, Inc., Material Safety Data Sheet, Vanlube DF-283, May 10, 2000.

(Continued)

*Primary Examiner* — Ellen M McAvoy
*Assistant Examiner* — Pamela Weiss

(57) ABSTRACT

Additives that inhibit the passage of oil across oil-air interfaces in disk drives and enable the use of the lower viscosity oil in disk drives are disclosed. Mass transfer of oil from the bulk liquid oil into the vapor phase takes place by oil molecules evaporating from the oil-air interface, or collections of oil molecules being ejected from the oil-air interface as aerosol. The invention reduces mass transfer across the oil-air interface through the use of oil-soluble surfactants.

14 Claims, 5 Drawing Sheets

OTHER PUBLICATIONS www.rtvanderbilt.com, Petroleum Other Products, Vanlube DF-283, Vanlube TK-100, Jun. 6, 2006, http://72.14.209.104/search?=cache:zPXJ2ssJgFMJ:www.rtvanderbilt.com/wwwprd.

Fomblin Z Derivatives, Product Data Sheet, Solvay Solexis, Dec. 2002, 3 pages.

Kasai, Paul H., "Z-dol and carbon overcoat: the bonding mechanism," Tribology Letters, vol. 26. No. 2, May 2007, pp. 93-101.

Pilati, F. et al., "Synthesis of polyesters-perfluoropolyethers block coplymers," Polymer Bulletin 28, 1992, pp. 11-157.

* cited by examiner

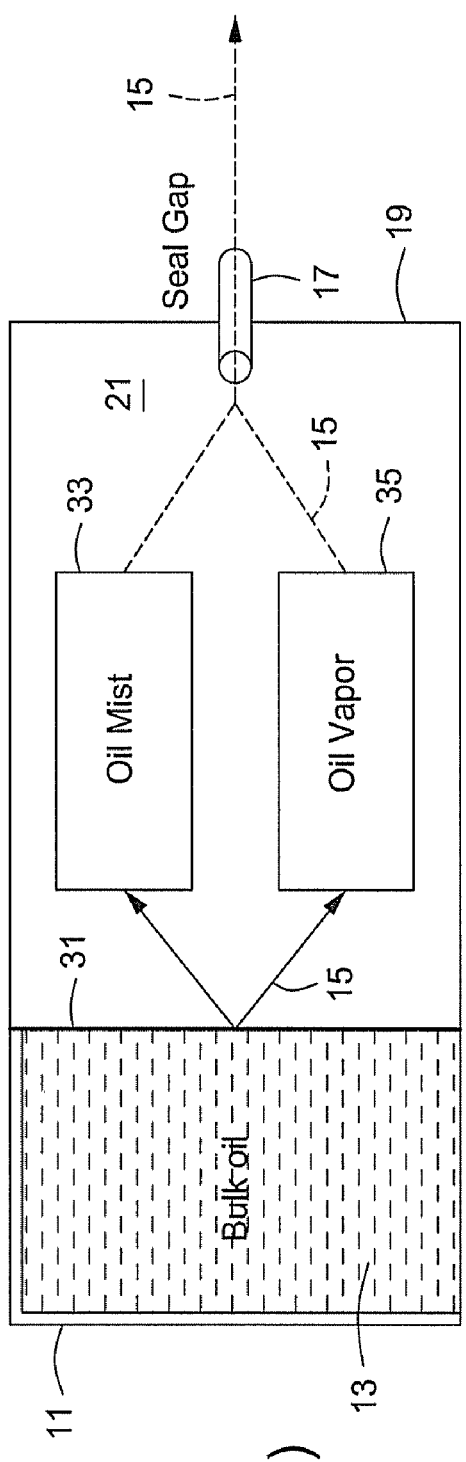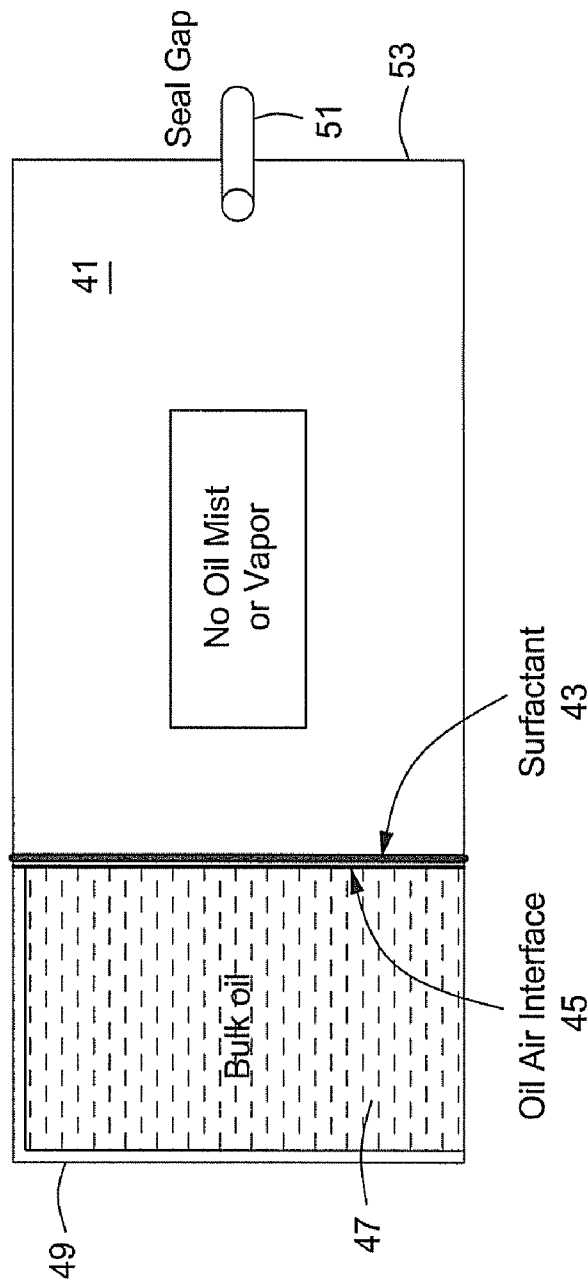
FIG. 3 (PRIOR ART)
FIG. 5

FLOW MODIFIERS FOR IMPROVED MAGNETIC RECORDING DEVICE

BACKGROUND OF THE INVENTION

1. Technical Field

The present invention relates in general to the lubrication of disk drives and, in particular, to an improved system, method, and apparatus for a disk drive equipped with special purpose additives that inhibit the passage of oil across an oil-air interface and enable the use of the lower viscosity oil in the disk drive.

2. Description of the Related Art

In the prior art, significant oil loss is observed from server class fluid bearing disk drive motors during accelerated life tests at elevated temperature. The pathway for oil loss from the upper part of a bearing in one design type is schematically illustrated in FIG. 1. FIG. 1 depicts a sectional view of an upper motor bearing 11 showing the oil 13, the pathway 15 for oil loss through a seal gap 17, and the seal 19 that slows down the rate at which oil leaves the bearing cavity 21. Sealing the motor bearing 11 decreases the oil loss, but oil is still emitted through the required air gap 17 in the seal 19.

For example, the oil loss from a bearing during accelerated motor reliability testing is shown in FIG. 2. FIG. 2 illustrates the oil remaining in a bearing as a function of time during continuous running at elevated temperature. The bearing was tested with a seal (upper line 25) and without a seal (lower line 27).

As shown in FIG. 3, the oil 13 exits the bearing 11 by first passing across the oil-air interface 31 into the bearing cavity 21, possibly via oil-air interface instability. The oil then convects and diffuses (e.g., indicted by arrows 15) as oil mist 33 and/or oil vapor 35 out of the interstitial region of the bearing cavity 21 through the seal gap 17. As demonstrated in FIG. 2, the oil loss from the cavity can be reduced with an improved seal gap configuration. Oil loss also can be decreased through the use of a less volatile oil. However, that option is a less desirable solution since an oil with lower volatility has a higher viscosity that can result in a 30% increase in power consumption and difficulty in cold starts. Thus, an improved solution would be desirable.

It is known that hydrocarbon monolayers inhibit vaporization of water by as much as 40 or 50% in applications involving cooling water in evaporative towers. See, e.g., U.S. Pat. Nos. 4,099,915 and 4,147,658. Hydrocarbon surfactants cannot readily form a low surface tension monolayer on the surface of another hydrocarbon, so these methods have not been successfully applied to suppress oil evaporation. Since evaporation of volatile hydrocarbons such as solvents and gasoline is a recognized problem, low permeability aqueous foam has been used to cover those types of surfaces. See, e.g., U.S. Pat. Nos. 5,434,192 and 5,296,164. However, a foam will not work in the fluid bearing motor of a disk drive because of the very small annular space limitations and because foams are not stable for the long life required of magnetic storage devices. U.S. Pat. No. 5,935,276 discloses another solution that uses a soluble polymer film to inhibit the evaporation of solvents or gasoline. Although polymers increase the viscosity of the fluid bearing oil, it does not provide enough suppression of evaporation.

Thus, none of the known solutions for suppressing the evaporation of fuel or oil are sufficient to provide an integral evaporation barrier in the presence of interfacial shear flow that is present on the oil meniscus in a disk drive fluid bearing spindle motor. In contrast, the invention disclosed herein teaches that novel fluorohydrocarbon surfactants form a layer on oil that mimics the evaporation suppression of hydrocarbon surfactants on water, and remains intact in the presence of surface shear flow of a disk drive motor.

SUMMARY OF THE INVENTION

Embodiments of a system, method, and apparatus for special purpose additives that inhibit the passage of oil across the oil-air interfaces in disk drives and enable the use of the lower viscosity oil in disk drives are disclosed. Mass transfer of oil from the bulk liquid oil into the vapor phase takes place by (1) oil molecules evaporating from the oil-air interface, or (2) collections of oil molecules being ejected from the oil-air interface as aerosol. The invention reduces mass transfer across the oil-air interface through the use of oil-soluble surfactants.

The surface layer between the oil and the air inhibits mass transfer of the oil molecules into the vapor by presenting an additional kinetic barrier to the vaporization free energy. To reduce foam, the surface layer also reduces the surface elasticity. In one embodiment, custom synthesized hydrocarbon esters of hydroxy-terminated perfluoropolyethers may be utilized. In an alternate embodiment, nonionic surfactant polymers (e.g., polyalkylene glycols) may be used to alter the droplet formation, hydrodynamic properties, and evaporation of the oil to provide evaporation and mist control. In an analogous situation, aerosolization of metal working fluids should be avoided to prevent health hazards associated with inhalation of oil mist by machine tool operators.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

FIG. 3 is a schematic diagram of a conventional disk drive motor bearing oil-air interface;

FIG. 5 is a schematic diagram of one embodiment of an oil-air interface constructed in accordance with the invention;

DETAILED DESCRIPTION OF THE INVENTION

Figure 4:
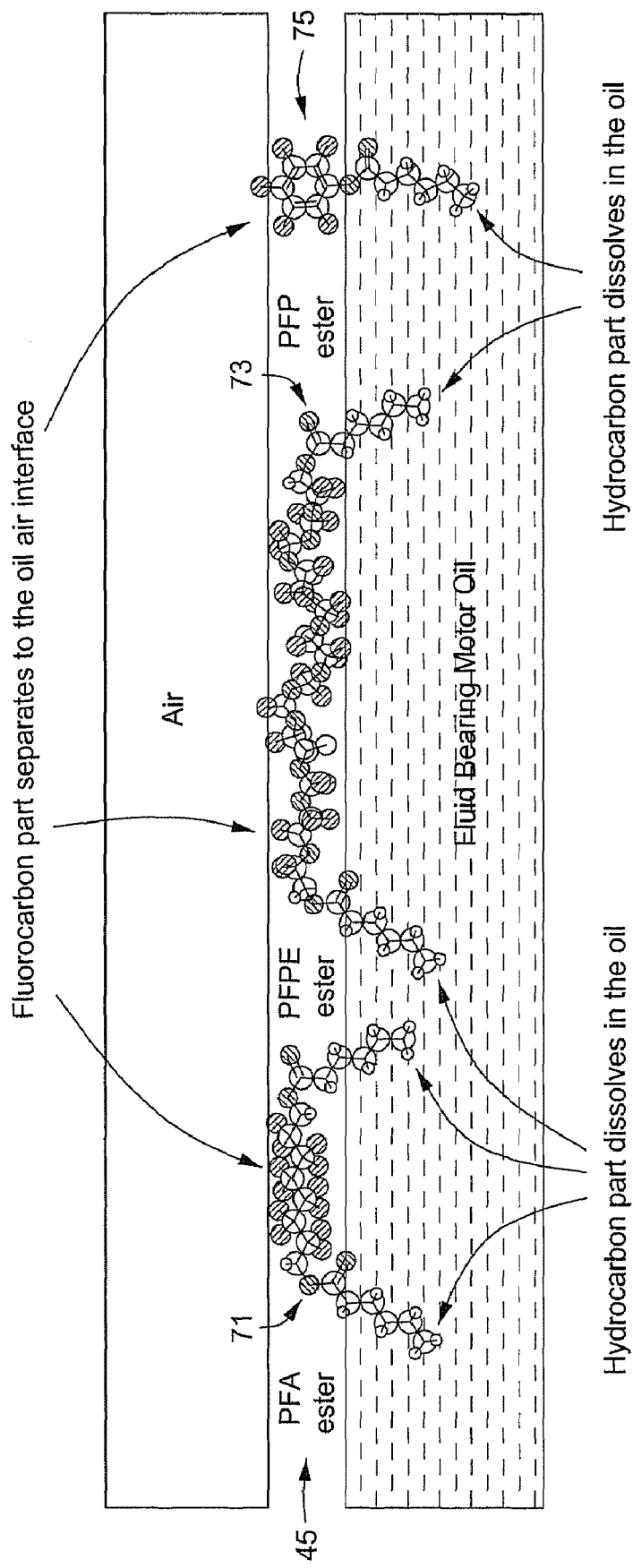
FIG. 4 is a schematic diagram depicting three different types of fluorohydrocarbon surfactant additives in a fluid bearing motor oil showing how they distribute at the oil-air interface.
Figure 6:
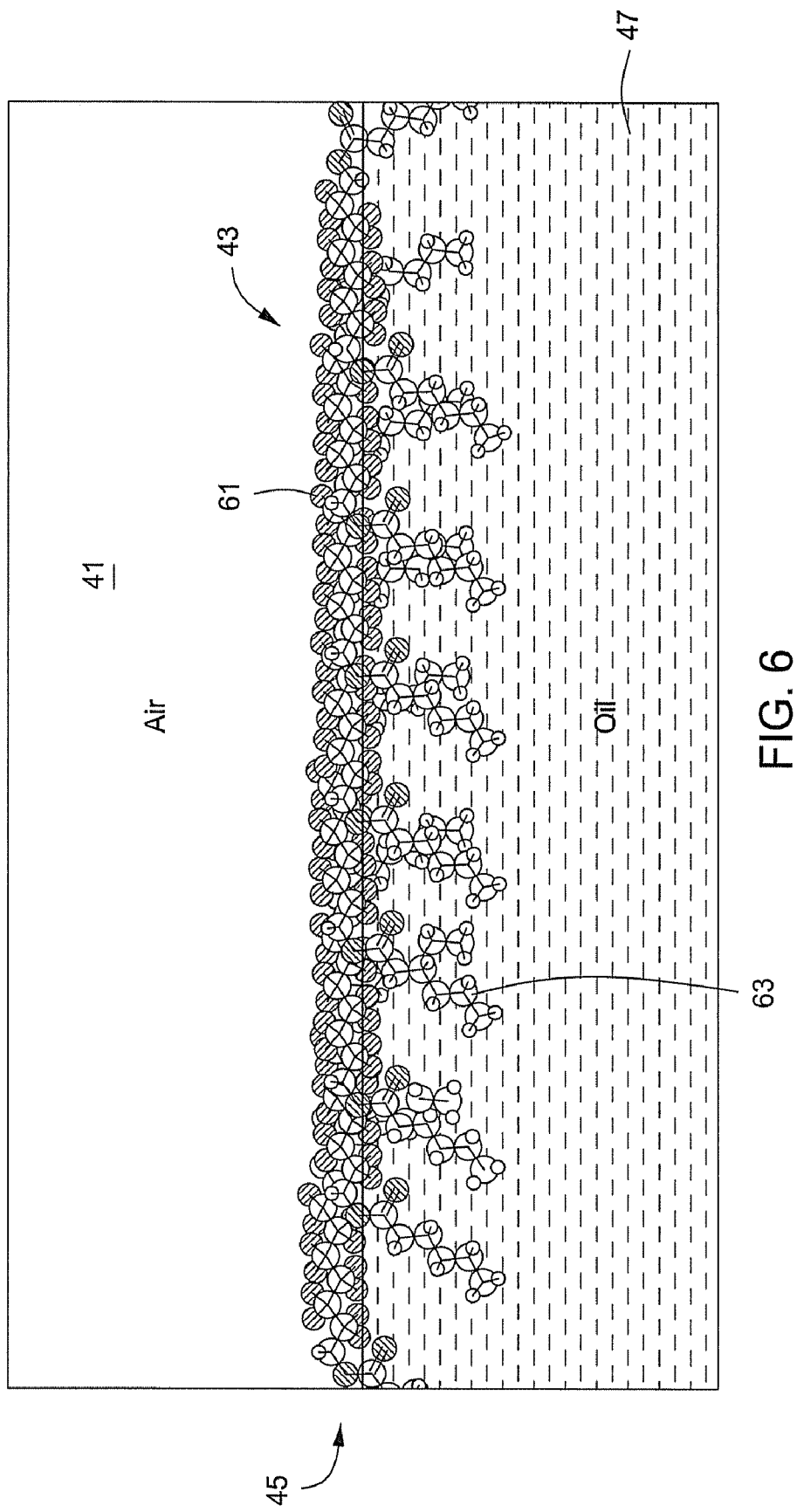
FIG. 6 is an enlarged schematic diagram of one embodiment of a fluorohydrocarbon surfactant in a bearing cavity and is constructed in accordance with the invention.

Referring to FIGS. 4-6, a system, method, and composition for special purpose additives that inhibit the passage of oil across the oil-gas interfaces in disk drives and enable the use of the lower viscosity oil in disk drives are disclosed. Mass transfer of oil from the bulk liquid oil into the vapor phase takes place by (1) oil molecules evaporating from the oil-air interface, or (2) collections of oil molecules being ejected from the oil-air interface as aerosol. The invention reduces mass transfer across the oil-air interface through the use of oil-soluble surfactants.

A molecule that is a surfactant is amphiphilic. For example, a molecule that is a surfactant in water (e.g., soap) contains a hydrophobic part and a hydrophilic part. The hydrophilic part of the surfactant molecule is water soluble, while the hydrophobic part of the surfactant molecule is insoluble and preferentially accumulates at the air interface. Similarly, a molecule that is a surfactant in oil contains an oleophobic part and an oleophilic part. The oleophilic part of the surfactant molecule is oil soluble, while the oleophobic part of the surfactant is insoluble, and preferentially accumulates at the oil-air interface.

A hydrocarbon surfactant that has a more polar part and a non-polar part, such as a polyalkylene glycol with a polar ether part block and a nonpolar alkane block, may act as a surfactant in the more polar hydrocarbon ester oils typically used in disk drive fluid bearings. In one embodiment, the surfactant for use in fluid bearing motor oils comprises a hydrocarbon part that is compatible with the fluid bearing oil, and a fluorocarbon part that is insoluble in the fluid bearing oil. The surfactant comprising a hydrocarbon part and a fluorocarbon part is referred to here as a fluorohydrocarbon surfactant.

FIG. 4 depicts three different embodiments of fluorohydrocarbon surfactants at an oil-air interface 45. For example, a PFA ester 71 may comprise 1H,1H,8H,8H-Perfluoro-1,8-octanediol di n-hexanoate; a Zdol ester 73 may comprise the ester of PFPE Zdol with hexanoic acid; and a PFP ester 75 may comprise pentafluorophenyl hexanoate. These example fluorohydrocarbons were specially synthesized for the oleophobic/oleophilic balance needed for them to be surface active in fluid bearing motor oil.

One embodiment that incorporates the net effect of the appropriately designed fluorohydrocarbon surfactant to prevent evaporation and aerosolization of oil into oil mist and loss thereof through the seal gap is shown in FIG. 5. The bearing cavity 41 with a surfactant barrier film 43 on the oil-air interface 45 prevents oil evaporation and aerosol formation at the oil-air interface 45. Although interface 45 is described as an "oil-air" interface, one skilled in the art will understand that the invention also is applicable to any suitable oil-gaseous (i.e., oil-gas) interface. The surfactant barrier film 43 inhibits the bulk oil 47 that is used to lubricate the bearing 49 from forming oil mist and/or vapor, and thereby significantly reduces the risk of oil loss through the seal gap 51 in seal 53.

The effectiveness of this solution is a function of the structure and composition of the surfactant, which governs its interaction with the motor oil. Specifically, if the surfactant is too completely soluble in the oil, the surface excess of surfactant at the oil-air interface is negligible, and there is no effect on evaporation or aerosolization. On the other hand, if the surfactant is not sufficiently soluble in the oil micelles are formed; in the extreme case, a separate liquid phase is formed. Thus, an appropriate balancing of the oleophobicity/oleophilicity is required.

In one embodiment (FIG. 6), a properly balanced fluorohydrocarbon ester surfactant 43 comprises a fluorocarbon portion 61 that resides primarily at the oil-air interface 45, while a hydrocarbon portion 63 resides within the hydrocarbon ester oil 47. The surface layer 61 between the oil 47 and the air 41 inhibits mass transfer of the oil molecules into vapor by presenting an additional kinetic barrier to the vaporization free energy. To reduce foam, the surface layer 61 also reduces the surface elasticity.

There are a number of approaches to achieving the appropriate balance of compatibility between the elements: (1) fluorocarbon/hydrocarbon ratio or fluorohydrocarbon surfactants, (2) polyalkylene glycol surfactants, and (3) commercial foam control agents (typically silicones or polyglycols).

In one embodiment, custom synthesized hydrocarbon esters of hydroxy-terminated perfluoropolyethers may be utilized. For example, a Z ester surfactant of an end group-modified perfluoropolyether may be used as a surfactant in ester-based oils. These types of materials act as both a surfactant and a viscoelastic flow agent in the fluid bearing motor oil. The Z esters may be formed through acyl chloride synthesis from a Ztetraol fraction with molecular weight of approximately 1000, or commercially, Ztetraol 1000. Esters of linear hydrocarbon acids with chain lengths C6 and C8 were prepared and stripped in a Kugelrohr. These materials were combined with fluid bearing motor base oil at 2 wt %. The fluid bearing motor oil was neopentyl glycol didecanoate.

In one embodiment, the molecular structure of a Zdol ester has a central perfluoropoyether with a C6 hydrocarbon acid esterified on each end. Zdol and Ztetraol alone are completely insoluble in the fluid bearing motor oil. The solubility of the perfluoropolyether ester is adjusted by the hydrocarbon chain length (e.g., C6 or C8) and one or two hydrocarbon chains per end (Zdol or Ztetraol).

In addition, the contact angles were measured for one candidate (Ztetraol C8 ester) using an Si wafer coated with poly 1H,1H-pentadecafluorooctyl methacrylate. A solution of 2% Ztetraol C8 ester decreased the contact angle of neopentyl glycol didecanoate by about 30 degrees. This much difference in the contact angle produces a measurable effect on the bubble deformation and evaporation of the oil. Specifically, the surface tension was decreased from 31 to 12 mN/m, which indicates a surface pressure of 19 mN/m in the fluorohydrocarbon surfactant film. Based on the kinetic rate model for diffusion, the corresponding reduction in the oil evaporation rate is only 49% of that for the pure oil at 85° C.

Since the Zdol and Ztetraol hydrocarbon esters are probably not optimized (i.e., the solutions appeared cloudy), fluorohydrocarbon surfactants were specially synthesized for balanced compatibility with fluid bearing motor oil. These were 1H,1H,8H,8H-Perfluoro-1,8-octanediol di n-hexanoate and pentafluorophenyl hexanoate, which are depicted in FIG. 4. The fluorohydrocarbon surfactants were completely soluble in an acrylate ester photoresist, so they are nearly optimal for surface modification of fluid bearing motor oil. In addition, they are thermally stable and have a low vapor pressure that is required for evaporation suppression of the oil.

In an alternate embodiment, nonionic surfactant polymers (e.g., polyalkylene glycols) may be used to alter the droplet formation, hydrodynamic properties, and evaporation of the oil to provide evaporation and mist control. In another alternate embodiment, aerosolization of metal working fluids should be avoided to prevent health hazards associated with inhalation of oil mist by machine tool operators. Foam control agents (e.g., polalkylene glycols, siloxanes, etc.) have been developed most extensively for use in metalworking fluids such as cutting oils, lubricants, and inks. These serve the same purpose that is desirable for control of aerosol mist in the fluid bearing cavity. Commercial foam control agents were found to be highly soluble in an acrylate ester photoresist which is similar to the fluid bearing motor oil. Commercial foam control agents were also soluble in a fluid bearing motor oil comprising neopentyl glycol didecanoate.

In one embodiment, the fluorohydrocarbon surfactants are combined with the oil in quantities from 0.01 to 5%, and preferably from 0.1 to 0.5%. The fluid bearing motor oils may comprise diester oils, a few examples of which are shown in Table 1.

TABLE 1

Motor base oil acronym definitions

| Acronym | Oil Formula Name |
|---------|------------------|
| DBS | di n-butyl sebacate |
| DOA | di 2-ethylhexyl adipate |
| DOZ | di 2-ethylhexyl azelate |
| NGDC | neopentyl glycol didecanoate |
| DIA | di isodecyl adipate |

For most of these oils with low viscosity, the vapor pressure is excessively high and, without the fluorohydrocarbon surfactant, the oil will substantially evaporate from the bearing at 85° C. The viscosity and vapor pressure of the oils is listed in Table 2.

TABLE 2

| Oil | Molecular Weight (g/mol) | Vapor Pressure (mPa, 85° C.) | Viscosity (mPa-s) 85° C. | Viscosity (mPa-s) 10° C. | Oil Loss in 4000 hrs (mg, 85° C.) Calculated | Estimated with 75% Evaporation Suppression |
|-----|---|---|---|---|---|---|
| DBS | 314 | 490 | 2.0 | 11 | 31.0 | 7.8 |
| DOA | 371 | 129 | 2.6 | 21 | 9.5 | 2.4 |
| DOZ | 413 | 53 | 3.2 | 28 | 4.4 | 1.1 |
| NGDC | 413 | 29 | 3.4 | 31 | 2.4 | 0.6 |
| DIA | 427 | 18 | 3.8 | 40 | 1.5 | 0.4 |

Table 2 depicts vapor pressure, viscosity, and calculated oil evaporation loss (after 4000 hours at 85° C.) from a typical fluid bearing motor oil bearing meniscus. The oil surface had an outer diameter of 7.4 mm, an inner diameter of 7.06 mm, and a diffusion boundary layer thickness of 0.44 mm. An oil that has a high viscosity at 10° C., but for which the oil evaporates at an acceptable rate at 85° C. is NGDC. The oil DOA has a much lower viscosity at 110° C., but alone the evaporation rate is much too high. With a film pressure of 23 mN/m, the fluorohydrocarbon surfactant suppresses the evaporation to an acceptable value as shown in the last column of Table 2. Alternatively, the oil may be di 2-ethylhexyl sebacate.

The fluorohydrocarbon surfactant may take the form of many different molecular structures. A few examples of molecular structures are listed in Table 3. One embodiment comprises Zdol-esters derived by esterification of perfluoropolyether Fomblin™ Zdol with hydrocarbon acids (first row of Table 3) where it is preferred that $3<a$, $b<16$, $0.2<p/q<10$, $10<x<50$, although it may be selected that $p=0$ or $q=0$, or the chain monomer may include perfluoropopropylene oxide or higher fluorinated ethers and fluorinated ethers with substituent groups.

TABLE 3

This table describes the molecular structures of five different examples of fluorohydrocarbon surfactants, the first four of which were specially prepared for use in hydrocarbon ester oils. The fluorowax is a semi-fluorinated alkane.

| name | structure |
|------|-----------|
| Zdol ester | $R_a OCH_2 CF_2 O-[(CF_2 CF_2 O)_p-(CF_2 O)_q]_x-CF_2 CH_2 OR_b$ <br> $R_y = C(O)-(CH_2)_y-CH_3$ |
| Ztetraol ester | $R_a OCH_2 CH(OR_b)CH_2 OCH_2 CF_2 O-[(CF_2 CF_2 O)_p-(CF_2 O)_q]_x-CF_2 CH_2 OCH_2 CH(OR_c)CH_2 OR_d$ <br> $R_y = C(O)-(CH_2)_y-CH_3$ |
| PFD-HCA ester | $CH_3(CH_2)_i C(O)OCH_2(CF_2)_j CH_2 OC(O)(CH_2)_k CH_3$ |
| PFP-HCA ester | $C_6 F_5 OC(O)(CH_2)_r CH_3$ |
| Diblock Fluorowax | $CF_3(CF_3)_j(CH_3)_i CH_3$ |

Another embodiment comprises Ztetraol-esters derived by esterification of perfluoropolyether Fomblin™ Ztetraol with hydrocarbon acids, where it is preferred that 3<a, b<16, 0.2<p/q<10, 10<x<50, although it may be selected that p=0 or q=0, or the chain monomer may include perfluoropopropylene oxide or higher fluorinated ethers and fluorinated ethers with substituent groups. Other embodiments include PFD-HCA esters such as semifluorinated diol esters with hydrocarbon acids, where it is preferred that 2<i, k<16, and 2<j<18; PFP-HCA esters such as pentafluorphenyl esters with hydrocarbon acid, where it is preferred that 3<r<18; and Diblock Fluorowax in which 6<j, l<17, which are commercially available and are known to form monolayers on hydrocarbon solvents. Alkyl and perfluoroallyl groups can be branched or linear or a combination of branched, linear, and ether groups.

In addition, other commercially available fluorosurfactants (e.g., DuPont Zonyl® and 3M Novec™) may similarly suppress oil evaporation from the disk motor as described here. Moreover, the fluid bearing motor oils themselves may contain foam control agents (e.g., Ivanhoe Industries FCA-1910 and FCA-1960) for the purpose of suppressing evaporation and aerosol formation. Fluid bearing motor oils also may contain a 0.01 to 5% of gellant (e.g., Arizona Chemical Sylvagel ester terminated polyamide resin), and/or 0.01 to 5% of polyalkylene glycol (e.g., Brij™ from Sigma-Aldrich) for aerosol and cavitation control. The Brij™ composition is $C_xCH_{2x+1}(OCH_2CH_2)_yOH$ and typically useful ranges of composition are 10<x<20 and 2<y<20. In addition to the special additives in this invention, a useful fluid bearing oil also may contain antioxidant, anticorrosion, antiwear, and/or conductivity additives.

Figure 1:
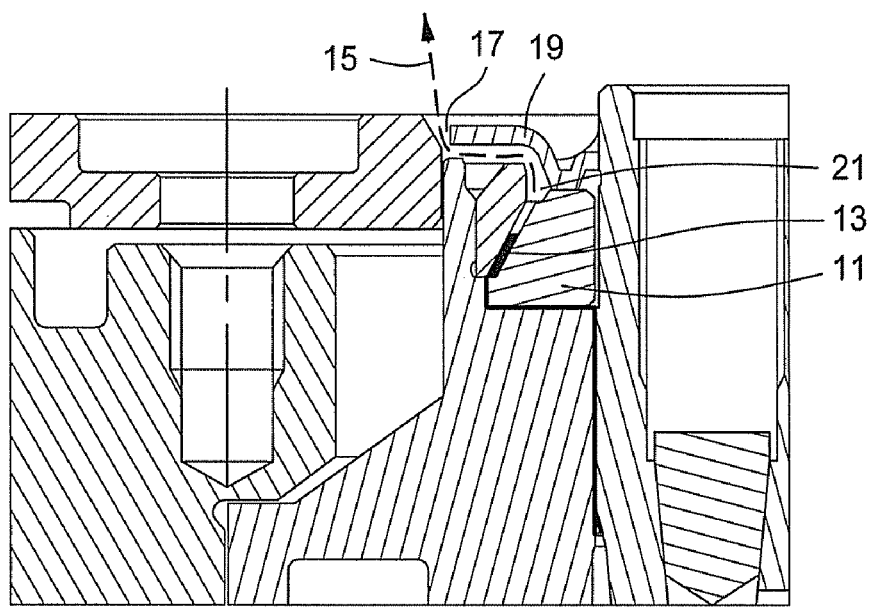
FIG. 1 is a sectional side view of a portion of a conventional disk drive motor fluid dynamic bearing.
Figure 7:
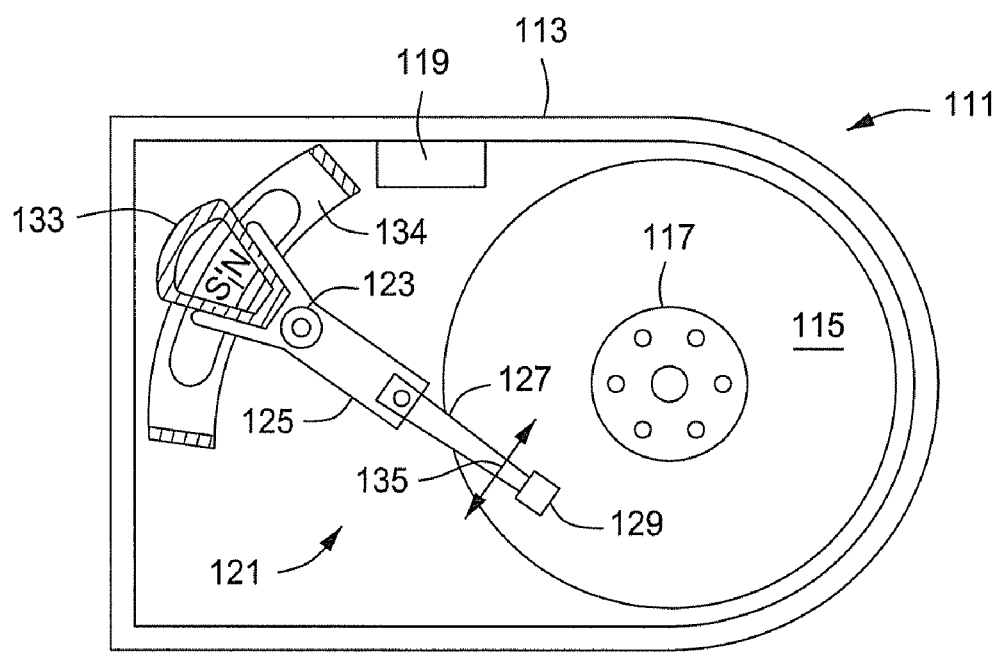
FIG. 7 is a simplified plan view of one embodiment of a disk drive constructed in accordance with the invention.
Figure 2:
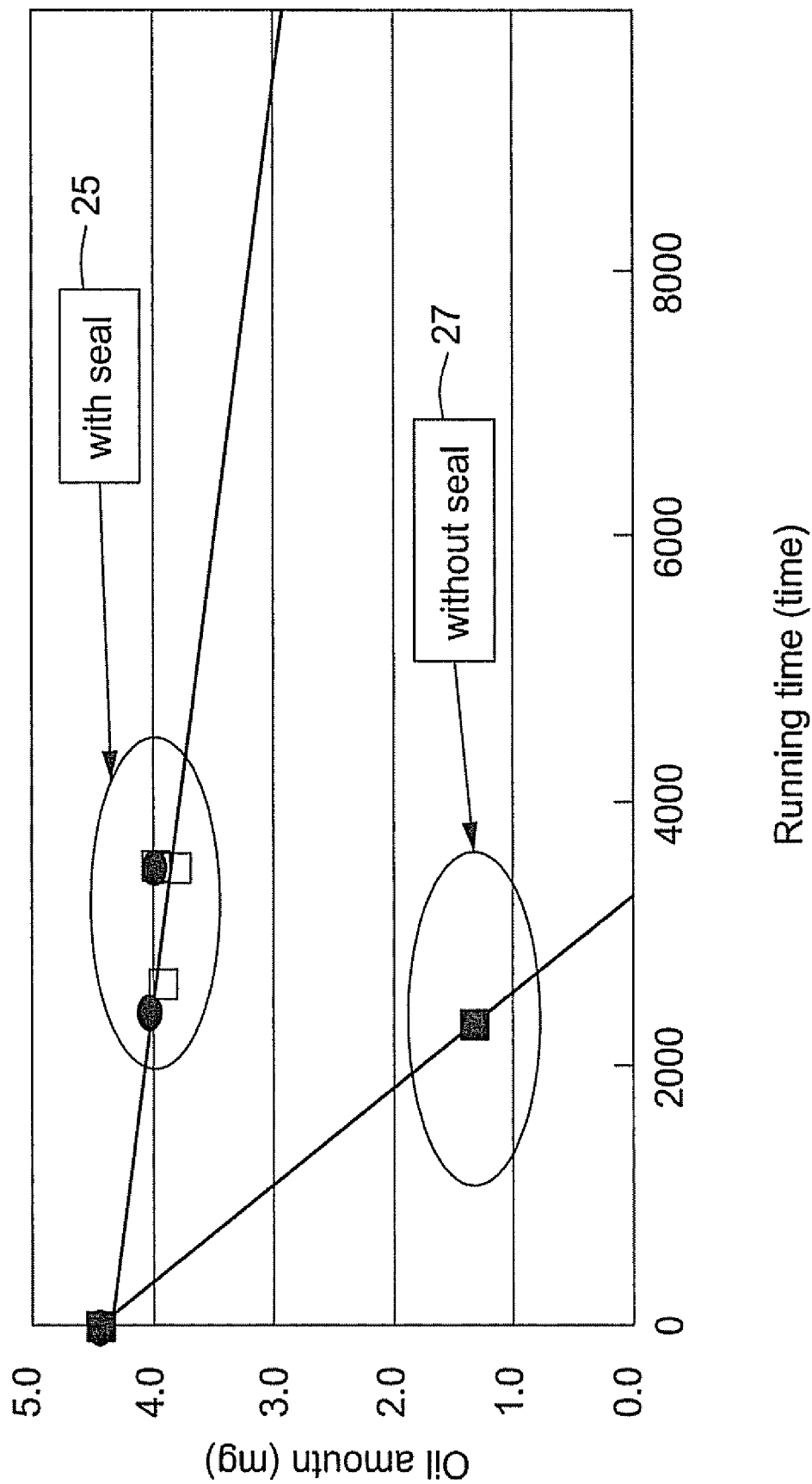
FIG. 2 depicts motor oil levels during testing of various types of conventional disk drives fluid dynamic bearing motors.

Referring now to FIG. 7, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117 that incorporates other features and elements described herein. An actuator 121 comprises one or more actuator arms 125 in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127.

Suspensions 127 have a spring-like quality which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

While the invention has been shown or described in only some of its forms, it should be apparent to those skilled in the art that it is not so limited, but is susceptible to various changes without departing from the scope of the invention.

What is claimed is:

1. A disk drive, comprising:
an enclosure;
a disk rotatably mounted to the enclosure and having magnetic media;
an actuator pivotally mounted to the enclosure and having a transducer for reading data from the magnetic media; the actuator further comprising:
a drive hub having a bearing that is lubricated with oil that defines an oil-gas interface, and a seal for retaining the oil, the seal having a seal gap; and
an additive located at the oil-gas interface for inhibiting passage of the oil across the oil-gas interface, wherein the additive includes a fluorohydrocarbon ester surfactant comprising a fluorinated portion that resides primarily at the oil-gas interface, and a hydrocarbon portion that resides within the oil.

2. A disk drive according to claim 1, wherein the additive comprises 0.01 to 5 wt % of the oil.

3. A disk drive according to claim 1, wherein the additive comprises 0.01 to 0.5 wt % of the oil.

4. A disk drive according to claim 1, wherein the oil is selected from the group consisting of di n-butyl sebacate (DBS), di 2-ethylhexyl adipate (DOA), di 2-ethylhexyl azelate (DOZ), neopentyl glycol didecanoate (NGDC), di isodecyl adipate (DIA), and di 2-ethylhexyl sebacate.

5. A disk drive according to claim 1, wherein the additive prevents evaporation and aerosolization of the oil into oil mist and oil vapor at the oil-gas interface through the seal gap and comprises a surfactant barrier film on the oil-gas interface.

6. A disk drive according to claim 1, wherein the fluorinated portion inhibits mass transfer of oil molecules into vapor by presenting an additional kinetic barrier to the vaporization free energy of the oil, and reduces the surface elasticity of the oil.

7. A disk drive according to claim 1, wherein the fluorohydrocarbon ester surfactant comprises a synthesized hydrocarbon ester of hydroxy-terminated perfluoropolyethers.

8. A disk drive according to claim 1, wherein the fluorohydrocarbon ester surfactant is both a surfactant and a viscoelastic flow agent.

9. A disk drive according to claim 1, wherein the fluorohydrocarbon ester surfactant comprises an ester having the formula:

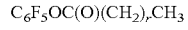

$C_6F_5OC(O)(CH_2)_rCH_3$ wherein 3<r<18.

10. A disk drive according to claim 1, wherein the fluorinated portion includes perfluoroalkyl groups selected from the groups consisting of branched, linear, and combinations of branched, linear, and ether groups.

11. A disk drive according to claim 1, wherein the oil includes 0.01 to 5 wt % gellant for aerosol and cavitation control.

12. A disk drive according to claim 1, wherein the oil includes 0.01 to 5 wt % of polyalkylene glycol for cavitation and aerosol control.

13. A disk drive according to claim 1, wherein the oil further includes at least one of an antioxidant, anticorrosion, antiwear, and conductivity additive.

14. A disk drive, comprising:
an enclosure;
a disk rotatably mounted to the enclosure and having magnetic media;
an actuator pivotally mounted to the enclosure and having a transducer for reading data from the magnetic media; the actuator further comprising:
a drive hub having a bearing that is lubricated with a mixture that defines a gas interface and a seal for retaining the mixture, the seal having a seal gap, the mixture including an ester-based oil and a fluorohydrocarbon ester surfactant, the fluorohydrocarbon ester surfactant comprising a synthesized hydrocarbon ester of hydroxy-terminated perfluoropolyether, the perfluoropolyether forming a fluorinated portion that resides primarily at the gas interface, and the hydrocarbon ester forming a hydrocarbon portion that resides within the mixture.

* * * * *